(No Model.)  2 Sheets—Sheet 2.
E. P. HOWE.
BRAKE FOR VELOCIPEDES.
No. 330,026. Patented Nov. 10, 1885.
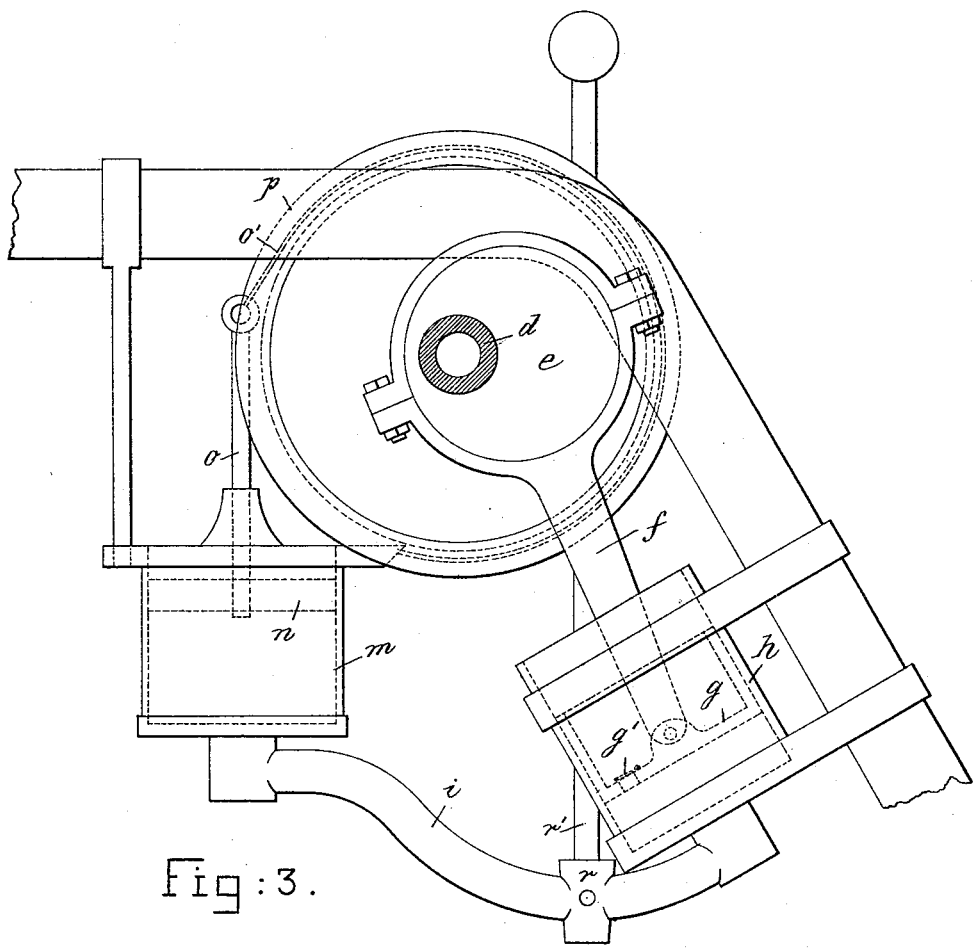
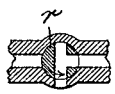
Witnesses.  Inventor.

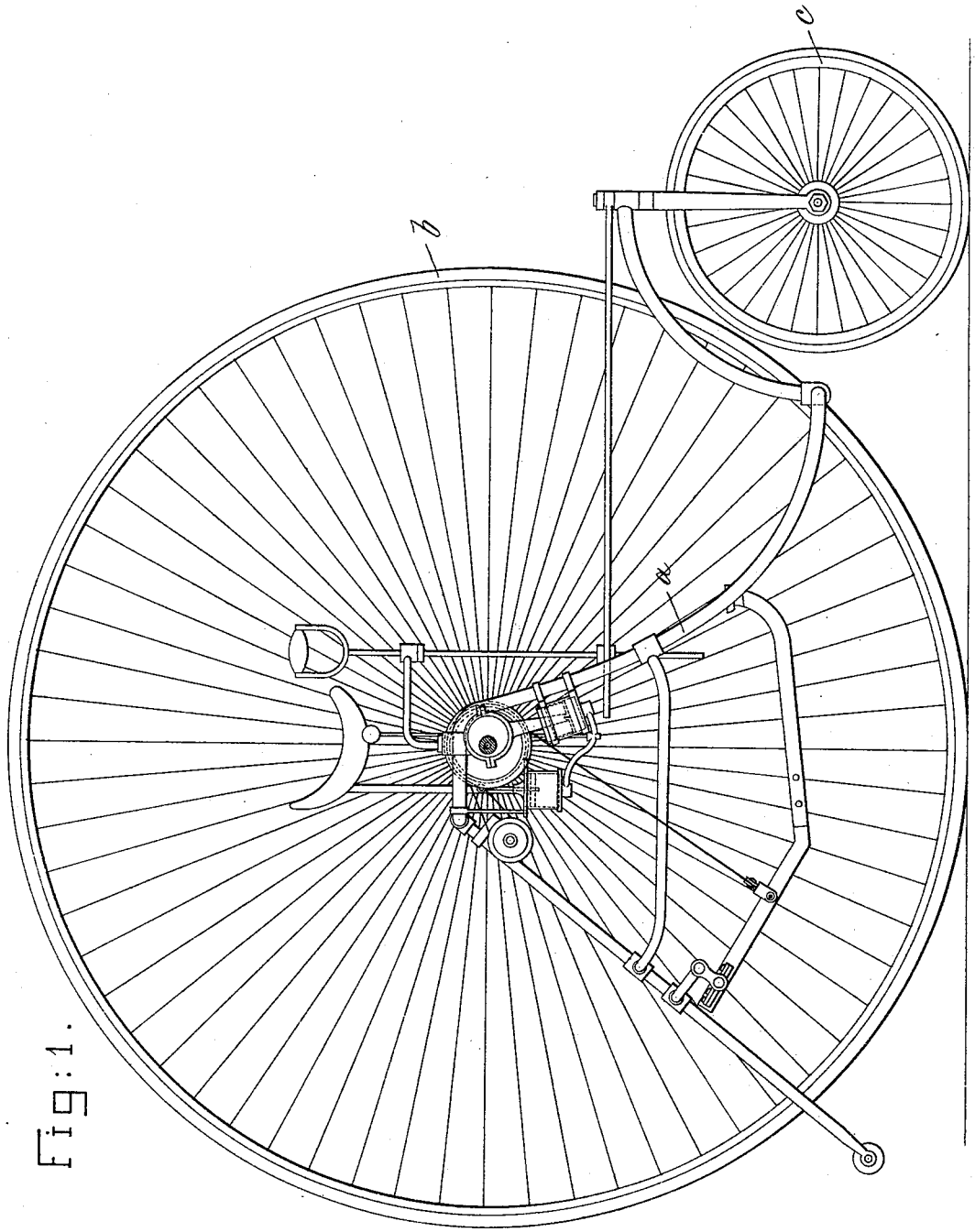

United States Patent Office.

EDWARD P. HOWE, OF NORTHBOROUGH, ASSIGNOR OF FIVE-EIGHTHS TO CHARLES R. ROGERS AND JOHN J. SHAW, OF PLYMOUTH, MASS.

BRAKE FOR VELOCIPEDES.

SPECIFICATION forming part of Letters Patent No. 330,026, dated November 10, 1885.

Application filed August 31, 1885. Serial No. 175,731. (No model.)

*To all whom it may concern:*

Be it known that I, EDWARD P. HOWE, of Northborough, county of Worcester, State of Massachusetts, have invented an Improvement in Brakes for Velocipedes, of which the following description, in connection with the accompanying drawings, is a specification, like letters on the drawings representing like parts.

This invention has for its object to provide a velocipede with an automatic brake, and is an improvement upon that shown and described by me in application Serial No. 133,363, filed May 31, 1884, to which reference may be had.

The invention consists, essentially, of an air-pump actuated while the velocipede is in motion to exhaust the air from a brake-cylinder the piston of which is connected with a braking device, thereby leaving an unbalanced atmospheric pressure on the said piston, forcing it through its cylinder and applying the brake, as will be described.

The piston of the air-pump is actuated by an eccentric rotated by any moving part of the velocipede—as, for instance, by its rotating shaft—said eccentric being connected with the piston by a pitman.

A controlling cock or valve operated by the rider may be employed to control the exhaust from the brake-cylinder, so that by merely turning the said cock the brake may be applied.

Figure 1 is a vertical section of a tricycle to which an automatic brake constructed in accordance with this invention is applied; Fig. 2, an enlarged detail of the brake mechanism itself, and Fig. 3 a detail of the controlling-cock.

The main frame-work $a$, with the driving-wheel $b$ and its actuating mechanism, and the steering-wheel $c$, may be of any usual construction. The rotating shaft or axle $d$ of the driving-wheel $b$ (see Fig. 2) is employed to rotate an eccentric, $e$, operating a pitman, $f$, connected with a piston, $g$, reciprocating in a cylinder, $h$, supported by a suitable portion of the frame-work. The piston $g$ is supplied with an ordinary clack-valve, $g'$, opening outward, to permit air contained in the cylinder to escape when necessary. The pipe $i$, leading from the cylinder $h$, connects it with a brake-cylinder, $m$, also supported by the frame-work $a$. The brake-cylinder $m$ is provided with a piston, $n$, which by a connecting-rod, $o$, is connected with the brake, which latter in this instance consists of a band, $o'$, passing over and bearing against a drum or hub, $p$, fixed upon the axle or otherwise connected with the driving-wheel of the velocipede. The pipe $i$ is provided with a controlling cock, $r$, consisting in this instance of an ordinary three-way cock, (see Fig. 3) which is provided with a stem, $r'$, extending upward sufficiently to be readily accessible to the rider.

The air-pump $h\ g$, actuated by the eccentric and its pitman, is designed to exhaust the air from the brake-cylinder $m$, thereby leaving an unbalanced atmospheric pressure on the piston $n$, forcing it through the cylinder $m$ and drawing the brake mechanism taut.

The eccentric $e$ is herein shown as to be continuously rotated by the rotating shaft $d$. Thus the air-pump is constantly at work.

The controlling-cock $r$ is normally in the position shown in Fig. 3, permitting air to enter the pipe $i$ to supply the air-pump, thus leaving the brake piston $n$ at rest; but when it is desired to apply the brake the operator merely turns the controlling-cock $r$, by means of the stem $r'$, in the direction of the arrow, Fig. 3, closing the opening of the passage of air from the outside and leaving a continuous passage through the pipe $i$.

Should the piston $g$ be at its starting-point when the cock is turned, the valve $g'$ will be employed to permit the air contained in the cylinder to escape. The next stroke of the piston $g$ exhausts the air from the cylinder $m$ and applies the brake; but should the piston be at its extreme movement at the time the cock is turned the valve $g'$ will not be employed.

To release the brake, the controlling-cock may be further turned in the direction of the arrow until a free passage is obtained for the air to enter the pipe $i$ and cylinder $m$, when the cock $r$ may be placed in the position Fig. 3 again.

Any other well-known means may be resorted to to permit the cylinder $m$ to become again filled with air after the same has been exhausted as described, without departing from my invention.

It is obvious that the eccentric *e* may be rotated by the wheel or any other moving part of the apparatus, and the results herein described obtained; also, that the said eccentric, instead of being continuously rotated, may be engaged with the actuating part by a suitable clutch mechanism, this being rotated at such time as it is desired to apply the brake.

Any other suitable brake mechanism may be employed connected with and actuated by the piston *n* as deemed necessary.

I claim—

In a velocipede, an air-pump consisting of a cylinder and piston, an eccentric rotated substantially as described, and connected with the piston of the air-pump by a pitman, combined with a brake-cylinder connected with the cylinder of the air-pump by a pipe, a cock in said pipe controlling the passage therethrough, and a piston moving in said brake-cylinder by the unbalanced atmospheric pressure thereon when the brake-cylinder is exhausted, and connected with the brake mechanism to operate substantially as set forth.

In testimony whereof I have signed my name to this specification in the presence of two subscribing witnesses.

EDWARD P. HOWE.

Witnesses:
   G. W. GREGORY,
   B. J. NOYES.